(12) United States Patent
Crawford

(10) Patent No.: US 6,276,877 B1
(45) Date of Patent: Aug. 21, 2001

(54) DISPLAY CARRIER CONTAINER

(76) Inventor: Kenneth Crawford, 2903 Torrey Pines Dr., Pickerington, OH (US) 43147

( * ) Notice: Subject to any disclaimer, the term of this patent is extended or adjusted under 35 U.S.C. 154(b) by 0 days.

(21) Appl. No.: 09/041,224

(22) Filed: Mar. 12, 1998

(51) Int. Cl.[7] .................................................. B65G 51/06
(52) U.S. Cl. ........................... 406/189; 406/184; 406/37; 40/306; 40/661
(58) Field of Search ....................... 406/34, 37, 184–190; 40/306, 661

(56) References Cited

U.S. PATENT DOCUMENTS

| | | | |
|---|---|---|---|
| 1,898,860 | * 2/1933 | Underwood | 406/186 |
| 2,844,893 | * 7/1958 | Keller | 40/306 |
| 3,226,054 | * 12/1965 | Zimmerman et al. | 406/37 |
| 4,324,511 | * 4/1982 | Irish | 406/190 |

* cited by examiner

Primary Examiner—Jospeh E. Valenza

(57) ABSTRACT

A new display carrier container for displaying a message, such as an advertisement. The inventive device includes a generally transparent tubular body having inner and outer surfaces and a pair of opposite ends. The inner surface of the body defines a lumen. Each end of the body has a opening into the lumen of the body. A pair of end caps are coupled to the ends of the body such that they close the openings of the ends of the body. One of the ends of the body has a slot therein. The slot is located between the inner and outer surfaces of the body and extends from the one end towards the other of the ends of the body. The slot is adapted for receiving a sheet therein.

5 Claims, 2 Drawing Sheets

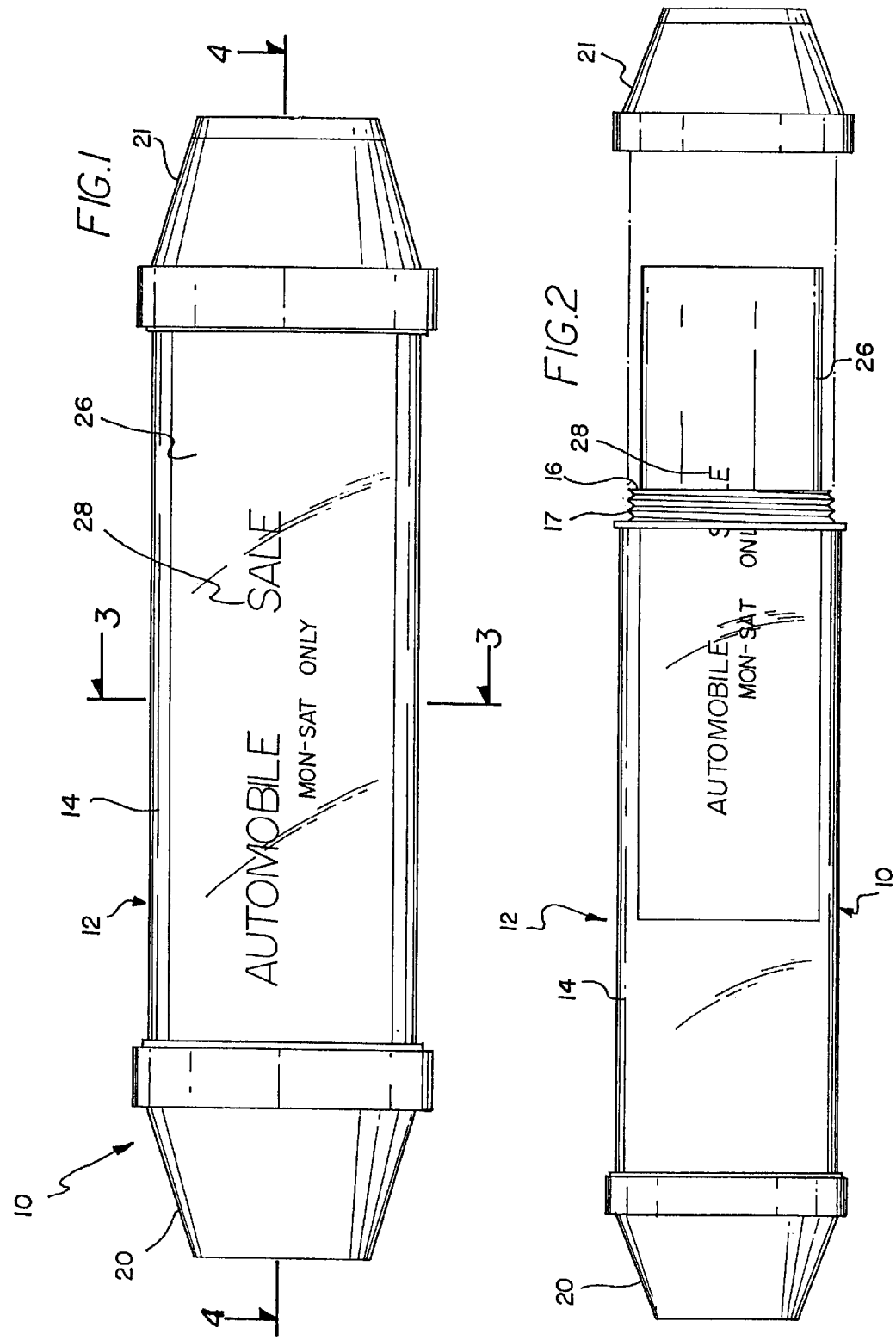

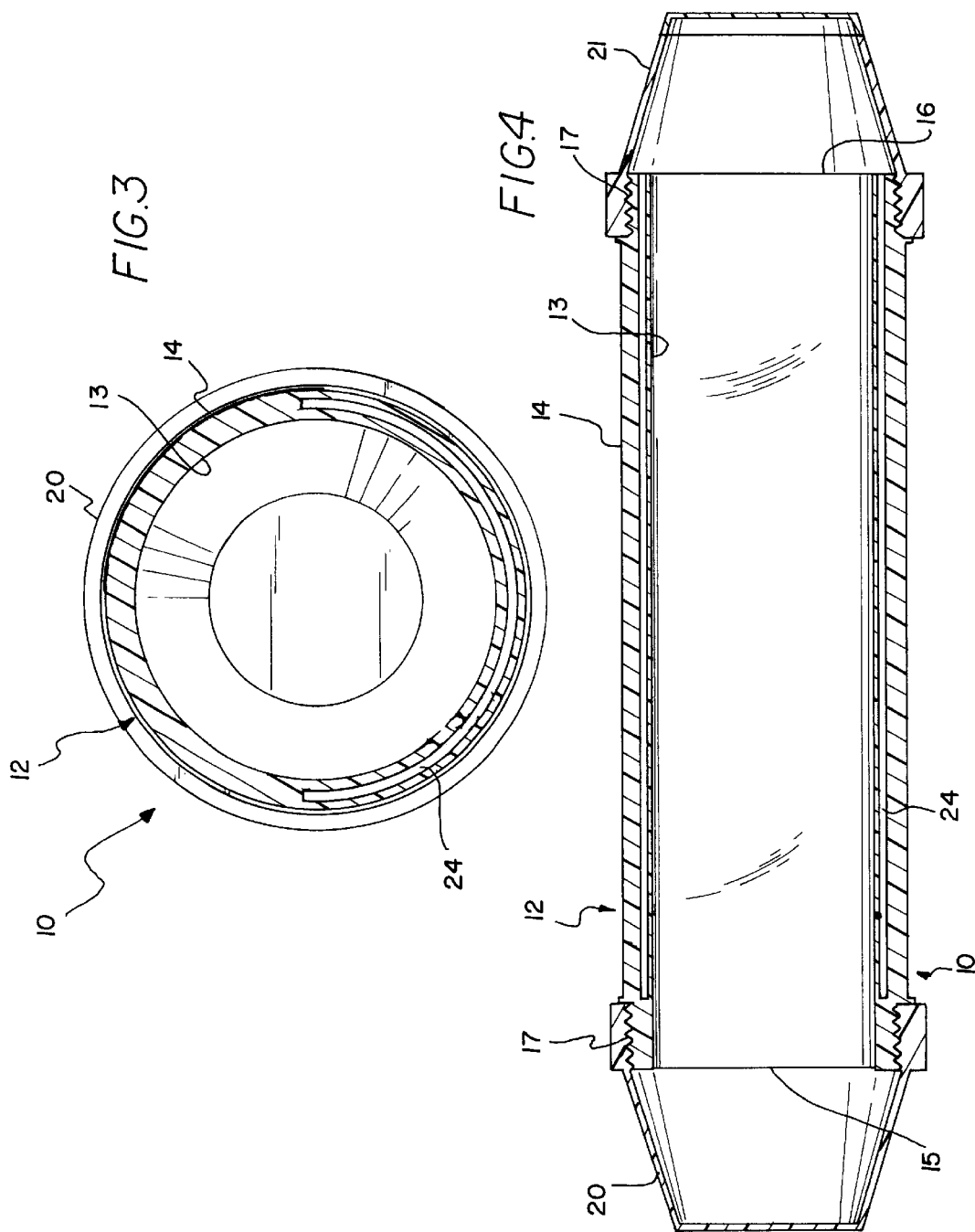

DISPLAY CARRIER CONTAINER

BACKGROUND OF THE INVENTION

1. Field of the Invention

The present invention relates to carrier container for pneumatic tube transfer systems of the sort disclosed in U.S. Pat. No. 4,135,684 by Willey, and more particularly pertains to a new display carrier container for displaying a message, such as an advertisement.

2. Description of the Prior Art

The use of carrier container for pneumatic tube transfer systems is known in the prior art. More specifically, carrier container for pneumatic tube transfer systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art carrier container for pneumatic tube transfer systems include U. S. Pat. No. 4,948,303; U.S. Pat. No. 4,470,730; U.S. Pat. No. 4,135,684; U.S. Pat. No. 5,181,805; U.S. Pat. No. 4,239,420; and U.S. Pat. No. 5,097,9868.

While these devices fulfill their respective, particular objectives and requirements, the aforementioned patents do not disclose a new display carrier container. The inventive device includes a generally transparent tubular body having inner and outer surfaces and a pair of opposite ends. The inner surface of the body defines a lumen. Each end of the body has a opening into the lumen of the body. A pair of end caps are coupled to the ends of the body such that they close the openings of the ends of the body. One of the ends of the body has a slot therein. The slot is located between the inner and outer surfaces of the body and extends from the one end towards the other of the ends of the body. The slot is adapted for receiving a sheet therein.

In these respects, the display carrier container according to the present invention substantially departs from the conventional concepts and designs of the prior art, and in so doing provides an apparatus primarily developed for the purpose of displaying a message, such as an advertisement.

SUMMARY OF THE INVENTION

In view of the foregoing disadvantages inherent in the known types of carrier container for pneumatic tube transfer systems now present in the prior art, the present invention provides a new display carrier container construction wherein the same can be utilized for displaying a message, such as an advertisement.

The general purpose of the present invention, which will be described subsequently in greater detail, is to provide a new display carrier container apparatus and method which has many of the advantages of the carrier container for pneumatic tube transfer systems mentioned heretofore and many novel features that result in a new display carrier container which is not anticipated, rendered obvious, suggested, or even implied by any of the prior art carrier container for pneumatic tube transfer systems, either alone or in any combination thereof.

To attain this, the present invention generally comprises a generally transparent tubular body having inner and outer surfaces and a pair of opposite ends. The inner surface of the body defines a lumen. Each end of the body has a opening into the lumen of the body. A pair of end caps are coupled to the ends of the body such that they close the openings of the ends of the body. One of the ends of the body has a slot therein. The slot is located between the inner and outer surfaces of the body and extends from the one end towards the other of the ends of the body. The slot is adapted for receiving a sheet therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pattent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new display carrier container apparatus and method which has many of the advantages of the carrier container for pneumatic tube transfer systems mentioned heretofore and many novel features that result in a new display carrier container which is not anticipated, rendered obvious, suggested, or even implied by any of the prior art carrier container for pneumatic tube transfer systems, either alone or in any combination thereof.

It is another object of the present invention to provide a new display carrier container which may be easily and efficiently manufactured and marketed.

It is a further object of the present invention to provide a new display carrier container which is of a durable and reliable construction.

An even further object of the present invention is to provide a new display carrier container which is susceptible of a low cost of manufacture with regard to both materials and labor, and which accordingly is then susceptible of low prices of sale to the consuming public, thereby making such display carrier container economically available to the buying public.

Still yet another object of the present invention is to provide a new display carrier container which provides in the apparatuses and methods of the prior art some of the advantages thereof, while simultaneously overcoming some of the disadvantages normally associated therewith.

Still another object of the present invention is to provide a new display carrier container for displaying a message, such as an advertisement.

Yet another object of the present invention is to provide a new display carrier container which includes a generally transparent tubular body having inner and outer surfaces and a pair of opposite ends. The inner surface of the body defines a lumen. Each end of the body has a opening into the lumen of the body. A pair of end caps are coupled to the ends of the body such that they close the openings of the ends of the body. One of the ends of the body has a slot therein. The slot is located between the inner and outer surfaces of the body and extends from the one end towards the other of the ends of the body. The slot is adapted for receiving a sheet therein.

Still yet another object of the present invention is to provide a new display carrier container that allows advertisements to be conveniently and removably displayed therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new display carrier container according to the present invention.

FIG. 2 is a schematic side view of the present invention with one end cap detached from the body.

FIG. 3 is a schematic cross sectional view of the present invention taken from line 3—3 of FIG. 1.

FIG. 4 is a schematic cross sectional view of the present invention taken from line 4—4 of FIG. 1.

DESCRIPTION OF THE PREFERRED EMBODIMENT

With reference now to the drawings, and in particular to FIGS. 1 through 4 thereof, a new display carrier container embodying the principles and concepts of the present invention and generally designated by the reference numeral 10 will be described.

As best illustrated in FIGS. 1 through 4, the display carrier container 10 generally comprises a generally transparent tubular body 12 having inner and outer surfaces 13,14 and a pair of opposite ends 15,16. The inner surface 13 of the body 12 defines a lumen. Each end 13,14 of the body 12 has a opening into the lumen of the body 12. A pair of end caps 20,21 are coupled to the ends 15,16 of the body 12 such that they close the openings of the ends 15,16 of the body 12. One of the ends 15,16 of the body 12 has a slot 24 therein. The slot 24 is located between the inner and outer surfaces 13,14 of the body 12 and extends from the one end 15 towards the other end 16 of the body 12. The slot 24 is adapted for receiving a sheet 26 therein.

The carrier container is designed for use in a pneumatic tube transfer system. In closer detail, the generally transparent tubular body 12 is preferably generally cylindrical and has inner and outer surfaces 13,14 and a pair of opposite ends 15,16. The body 12 has a center axis which extends through the ends 15,16 of the body 12. The inner surface 13 of the body 12 defines a lumen for containing items to be transported by the transfer system.

Each end 15,16 of the body 12 has a opening into the lumen of the body 12. Preferably, the openings each have a generally circular perimeter. Ideally, the outer surface 14 of the body 12 is threaded 17 at each of the ends 15,16 of the body 12. The container 10 also includes a pair of end caps 20,21 with one end cap 20 threadedly coupled to one end 15 of the body 12 such that the one end cap 20 closes the opening of the one end 15 of the body 12. Similarly, the other end cap 21 is threadedly coupled to the other end 16 of the body 12 such that the other end cap 21 closes the opening of the other end 16 of the body 12. In an ideal embodiment, the end caps 20,21 each have a frusto-conical profile which tapers away from their associated end 15,16 of the body 12

As best illustrated in FIGS. 3 and 4, one of the ends 15 has a slot 24 therein. The slot 24 is located between the inner and outer surfaces 13,14 of the body 12. The slot 24 extends from the one end 15 towards the other 16 ends of the body 12, preferably so that the slot extended almost the entire length of the body 12. In the preferred embodiment, the slot 24 has a generally semi-circular cross section which is taken in a plane substantially perpendicular to the center axis of the body 12 such that slot 24 forms an arc with its longitudinal sides extending across the diameter of the body 12. The slot 24 is adapted for receiving a sheet 26, preferably a rectangular sheet 26 therein for displaying indicia 28 and images on the sheet 26 that may be seen through the body 12, while at the same time, permitting the lumen of the body 12 to be visible through the other semi-circular half of the body 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A carrier container for a pneumatic tube transfer system, comprising:

a generally transparent tubular body having inner and outer surfaces, and a pair of opposite ends, said body having a center axis being extended between said ends of said body, said inner surface of said body defining a lumen;

each of said ends of said body having a opening into said lumen of said body;

a pair of end caps, one of said end caps being coupled to one end of said body such that said one end cap closes the opening of said one end of said body, an other of said end caps being coupled to an other end of said body such that said other end cap closes the opening of said other end of said body; and one of said ends having a slot therein, said slot being located between said inner and outer surfaces of said body, said slot being extended from said one end towards the other of said ends of said body, said slot being adapted for receiving a sheet therein.

2. The carrier container of claim 1, wherein body is generally cylindrical, wherein said openings of said ends of said body each have a generally circular perimeter.

3. The carrier container of claim 1, wherein said outer surface of said body is threaded at each of said ends of said body, wherein said end caps are threadedly coupled to their associated end of said body.

4. The carrier container of claim 1, wherein said slot has a generally semi-circular cross section being taken in a plane substantially perpendicular to said center axis of said body.

5. A carrier container for a pneumatic tube transfer system, comprising:

a generally transparent tubular body being generally cylindrical and having inner and outer surfaces, and a pair of opposite ends, said body having a center axis being extended between said ends of said body, said inner surface of said body defining a lumen;

each of said ends of said body having a opening into said lumen of said body, wherein said openings each have a generally circular perimeter;

wherein said outer surface of said body is threaded at each of said ends of said body;

a pair of end caps, one of said end caps being threadedly coupled to one end of said body such that said one end cap closes the opening of said one end of said body, an other of said end caps being threadedly coupled to an other end of said body such that said other end cap closes the opening of said other end of said body; and one of said ends having a slot therein, said slot being located between said inner and outer surfaces of said body, said slot being extended from said one end towards the other of said ends of said body, wherein said slot has a generally semi-circular cross section being taken in a plane substantially perpendicular to said center axis of said body, said slot being adapted for receiving a sheet therein.

* * * * *